(12) United States Patent
De La Mora

(10) Patent No.: US 6,825,464 B2
(45) Date of Patent: Nov. 30, 2004

(54) METHOD AND APPARATUS TO PRODUCE IONS AND NANODROPS FROM TAYLOR CONES OF VOLATILE LIQUIDS AT REDUCED PRESSURES

(75) Inventor: Juan Fernandez De La Mora, New Haven, CT (US)

(73) Assignee: Yale University, New Haven, CT (US)

( * ) Notice: Subject to any disclaimer, the term of this patent is extended or adjusted under 35 U.S.C. 154(b) by 29 days.

(21) Appl. No.: 10/264,723

(22) Filed: Oct. 4, 2002

(65) Prior Publication Data

US 2003/0066969 A1 Apr. 10, 2003

Related U.S. Application Data

(60) Provisional application No. 60/327,528, filed on Oct. 5, 2001.

(51) Int. Cl.$^7$ .............................................. B01D 59/44
(52) U.S. Cl. ..................... 250/288; 250/424; 250/425
(58) Field of Search .............................. 250/288, 425, 250/424, 423 R

(56) References Cited

U.S. PATENT DOCUMENTS

| | | | |
|---|---|---|---|
| 5,115,131 A | 5/1992 | Jorgenson et al. | |
| 5,873,523 A | 2/1999 | Gomez et al. | |
| 6,127,680 A | 10/2000 | Andrien, Jr. et al. | ....... 250/288 |
| 6,297,499 B1 | * 10/2001 | Fenn | ......................... 250/288 |

OTHER PUBLICATIONS

Ion Mobility Spectrometry, Gary Alan Eiceman, et al., CRC Press, © 1994.

Direct Measurement of Ion Evaporation Kinetics From Electrified Liquid Surfaces, M. Gamero–Castano, et al., Journal of Chemical Physics, vol. 113, No. 2, Jul. 2000, pp. 815–832.

Electrospray As A Source Of Nanoparticles For Efficient Colloid Thrusters, M. Gamero–Castano, et al., American Institute of Aeronautics and Astronautics, AIAA—2000—3265, pp. 1–14.

Measurement of the Energy Dissipated In The Electrostatic Spraying Process, M. N. Huberman, Journal of Applied Physics, vol. 41, No. 2, Feb. 1970, pp. 578–584.

On The Evaporation Of Small Ions From Charged Droplets, J.V. Iribarne, et al., The Journal of Chemical Physics, vol. 64, No. 6, Mar. 1976, pp. 2287–2294.

Parametric Studies With A Single–Needle Colloid Thruster, Philip W. Kidd, Journal of Spacecraft, vol. 5, No. 9, pp. 1034–1039.

Liquid Metal Droplets For Heavy Particle Propulsion, Victor E. Krohn, Jr., Paper Presented At The ARS Electrostatic Propulsion Conference, Nov., 1960, pp. 73–80.

A Continuum Model For Ion Evaporation From A Drop: Effect of Curvature and Charge On Ion Solvation Energy, M. Labowsky, et al., Analytica Chimica Acta 406, (2000) pp. 105–118.

(List continued on next page.)

*Primary Examiner*—Kiet T. Nguyen
(74) *Attorney, Agent, or Firm*—Carmody & Torrance LLP

(57) ABSTRACT

The present invention concerns the formation of a stable electrospray of a volatile liquid at reduced pressures by limiting its tendency to evaporate. In a first approach, multi-component capillary jets are produced, comprising a thin layer of low volatility liquid, which is not necessarily a good conductor, surrounding a core of volatile and conducting liquid such as water, so as to minimize direct exposure of the volatile liquid to the region of low pressure. In a second approach, the diameter of the meniscus of a Taylor cone is reduced to a critical diameter, below which no evaporative freezing occurs.

24 Claims, 3 Drawing Sheets

OTHER PUBLICATIONS

A Novel Technique To Produce Multicomponent Micro/Nano Capillary Jets and Micro/Nano Capsules By Electrohydrodynamic Forces, I.G. Loscertales, et al., Abstracts of the European Aerosol Conference 2001, pp. S611–S612.

Micro/Nano Encapsulation via Electrified Coaxial Liquid Jets, I.G. Loscertales, et al., SCIENCE, vol. 295, Mar. 2002, pp. 1695–1698.

Experiments On The Kinetics of Field Evaporation of Small Ions From Droplets, I.G. Loscertales, et al., The Journal of Chemical Physics, Sep. 1995, vol. 103, No. 12, pp. 5041–5060.

Research and Development Of A Charged–Particle Bipolar Thruster, Julius Perel, et al., AIAA Joural, vol. 7, No. 3, Mar. 1969, pp. 507–511.

Ion Propulsion For Space Flight, Stuhlinger, E., (1964), Section 5–8, pp. 248–269.

Field Induced Ion Evaporation From Liquid Surfaces At Atmospheric Pressure, B. A. Thomson, et al., The Journal of Chemical Physics, vol. 71, No. 11, Dec. 1979, pp. 4451–4463.

Electrospray And Taylor–Cone Theory, Dole's Beam of Macromolecules At Last, M. Wilm, et al., International Journal of Mass Spectrometry and Ion Processes 136 (1994) pp. 167–180.

Analytical Properties Of The Nanoelectrospray Ion Source, M. Wilm, et al., Analytical Chemistry, vol. 68, No. 1, Jan. 1996, pp. 1–8.

* cited by examiner

METHOD AND APPARATUS TO PRODUCE IONS AND NANODROPS FROM TAYLOR CONES OF VOLATILE LIQUIDS AT REDUCED PRESSURES

CROSS-REFERENCE TO RELATED APPLICATION

This application claims the benefit of priority to U.S. Provisional Patent Application No. 60/327,528, filed on Oct. 5, 2001.

FIELD OF THE INVENTION

This invention relates to a method of forming a stable electrospray of a volatile liquid in a low-pressure environment while avoiding the tendency for the volatile liquid to freeze, boil, or evaporate.

BACKGROUND OF THE INVENTION

There have been many efforts to produce stable electrosprays of liquids in a low-pressure environment, especially for use in electrical propulsion. In this electrospray technique, often referred to as colloidal propulsion, a conducting liquid is slowly injected through an electrified capillary tube. When the electrical potential between the liquid and its surroundings rises to a few kilovolts, the meniscus at the tube exit develops a conical shape, commonly referred to as the Taylor cone. A thin microthread of liquid is issued from the tip of the Taylor cone, which eventually fragments to form a spray of highly charged droplets.

Glycerol has traditionally been the propellant of choice in colloidal propulsion. However, the high viscosity and low electrical conductivity of glycerol have precluded the ability to produce the small charge drops desired and have led researchers to consider other propellant choices. Newer approaches have relied on the use of electrolytes based on formamide or other amides, glycols, organic phosphates and carbonates, certain molten salts, etc., which are much less viscous and far more conductive than those based on glycerol. These more favorable properties make it possible to produce charged drops in the diameter range of a few tens of nanometers, rather than the few hundred nanometers afforded by glycerol colloids, which in turn allows higher specific impulses at smaller acceleration voltages. Ideally, from the electrical propulsion viewpoint, it would be desirable for a variety of applications, to produce even smaller drops, since their charge over mass ratio would be further increased over the values now possible with formamide. However, this objective is precluded in formamide electrolytes by two obstacles: 1) electrical conductivities in room temperature formamide are limited to about 2 S/m; and 2) ions begin to evaporate from the meniscus surface at electrical conductivities of about 1.5 S/m, and the mixed emissions of drops and ions reduces considerably the propulsion efficiency.

The current situation as it relates to available fuels for electrical propulsion may be summarized with reference to FIG. 1, which demonstrates the range of mass over charge ratios attainable in principle via Taylor cones in a low-pressure environment. M/q is represented as m/z in the atomic mass units generally used in mass spectrometry (m/z ~1 for $H^+$). The gap below $10^5$ Dalton may currently be covered only at limited propulsion efficiency in the mixed regime, where both ions and drops are produced.

On the right side of FIG. 1, one sees the range of m/z available from formamide and glycerol based colloidal sources. On the left side of FIG. 1, are ion sources based on gas sources (Xe), liquid metal ion sources ($Cs^+$, $Au^+$) and room-temperature molten salts (ionic liquids). The latter type includes existing ionic liquids whose masses extend almost to 1000 Dalton, as well as heavier ionic liquids that may be synthesized in the near future. No experiments have yet been carried out with ionic liquids other than with a few salts of 1-Ethyl-3-Methyl imidazolium$^+$(EMIm$^+$; m/z= 111.2), so the ionic liquid bars in FIG. 1 remain hypothetical.

The significance of FIG. 1 follows from the fact that one of the major parameters available to optimize the propulsion system ideal for a particular mission is precisely m/z (the same holds for almost all applications of ion or charged particle beams). The considerations involved for electrical propulsion are complex and address primarily the energy required to accelerate the ejected fuel, as well as the impulse derived per unit mass of fuel. Light ions produce the highest specific impulse, but tend to deliver very small currents and at a high energy cost. The opposite limit is that of heavy charged particles. The optimal m/z is conventionally placed in the middle of the gap region shown (though this is mission and materials dependent). For that reason, one goal of the research on colloidal and ionic propulsion is aimed at identifying new materials able to fill various regions of that gap, including formamide and ionic liquids.

Patent Application Publication No. US 2002/0109104 A1, the disclosure of which is herein incorporated by reference in its entirety, describes a method of producing ions and nanodrops from Taylor cones at reduced pressures. This invention, however, is at present limited to a few liquids enjoying simultaneously the special properties of having low volatilities and high electrical conductivities. For many of the applications described in the above referenced Patent Application Publication, it would be highly advantageous to also be able to use more volatile liquids.

US 2002/0109104 A1 lists a number of materials suitable for forming Taylor cones in a vacuum. Some of these materials, such as formamide, do indeed produce Taylor cones in a vacuum. However, under the conditions of most interest for the US 2002/0109104 Application, formamide solutions are in fact sufficiently volatile to disrupt the operation of Taylor cones.

Gamero-Castaño et al., Electrospray as a Source of Nanoparticles for Efficient Colloid thrusters, Journal of Propulsion and Power, Vol. 17, pp. 977–987 (2001), the subject matter of which is herein incorporated by reference in its entirety, reported that when using 20 micron tips and when operating with high conductivity, formamide solutions and low liquid flow rates injected into the meniscus, about half of their solvent was lost by evaporation rather than being ejected as drops.

Solvent volatility therefore introduces serious limitations, even in the case of solvents that can be electrosprayed in a low-pressure environment for the following reasons: the mass lost by evaporation does not produce thrust, and is therefore wasted from the viewpoint of space propulsion. The loss of solvent may lead to-salt precipitation and emitter clogging, and the avoiding of such a catastrophic instance requires the use of solvent concentrations well below saturation, which in turn limits the electrical conductivity of the solution and hence its performance in electrical propulsion. The present invention not only enables the formation of Taylor cones of liquids which would ordinarily boil or freeze, but also improves the performance of moderately volatile liquids included in the earlier invention, which neither boil nor freeze, but whose volatility limits their performance.

The maximum charge to mass ratio that electrolytes of glycerol or formamide, and ionic liquids are able to deliver as pure drops is limited by the onset of ion evaporation below a critical drop size, which reduces drastically the propulsion efficiency and introduces other complications. Their ability to operate in the pure ion evaporation mode is also limited at room temperature by the finite electrical conductivities of these substances. From the viewpoint of electrical propulsion and many others, it would be advantageous to be able to attain still higher charge to mass ratios within the pure drop regime, as well as lower charge to mass ratios within the pure ion regime.

Water is an exceptional solvent, with singular values of the electrical conductivity, surface tension and ion solvation energy, as well as stability with acids and bases. These properties would allow for the production of low-pressure sources of ions and drops that are far better than currently available materials. A number of volatile solvents other than water may also have considerable advantages.

The goal of the present invention is to enable the formation of Taylor cones of volatile liquids in a vacuum or in a low-pressure environment. The advantages of doing so, and the means to attain this goal are discussed below mainly in relation to the problem of electrical propulsion. However, similar applications to other fields making use of beams of ions and charged nanometer drops are equally evident, and are also considered as part of this invention. Although the illustrative case of water is mainly discussed as an example of a volatile liquid to be electrosprayed at low pressure, other volatile solvents are also of considerable interest, and are included as part of this invention. This invention is not limited either to the case of high conductivity liquids, but includes all volatile liquids that can be sprayed in a vacuum or a low-pressure environment by the proposed means.

SUMMARY OF THE INVENTION

The present invention is directed to a method of forming a stable electrospray of a volatile liquid in a low pressure environment comprising the steps of:
   a) supplying one or more liquids into an emitter electrode located in a low pressure environment, wherein one of said liquids is a volatile liquid, and
   b) establishing a voltage difference between said emitter electrode and one or more surrounding electrodes or grids, wherein a meniscus formed by said one or more liquids supplied to said emitter electrode forms one or more Taylor cones, from whose tip region at least drops and/or ions of said one or more liquids are ejected,
wherein a tendency of said volatile liquid to freeze, boil, or evaporate is diminished by a suitable evaporation-reduction means.

In a preferred embodiment, two liquids are supplied into the emitter electrode, a volatile liquid and an involatile liquid, and the evaporation-reduction means comprises covering most of the free surface of the volatile liquid with a layer of the involatile liquid, so as to minimize direct exposure of the volatile liquid with the low-pressure region.

In a second preferred embodiment, only the volatile liquid is supplied into the emitter electrode, and the evaporation-reduction means comprises reducing the dimensions of the free surface of the volatile liquid exposed to said low pressure region to below a critical value, such that evaporative cooling does not cause the Taylor cone to freeze.

BRIEF DESCRIPTION OF THE DRAWINGS

FIG. 2B is an expanded view of several elements represented in FIG. 2a.

DETAILED DESCRIPTION OF THE PREFERRED EMBODIMENTS OF THE INVENTION

Figure 1:
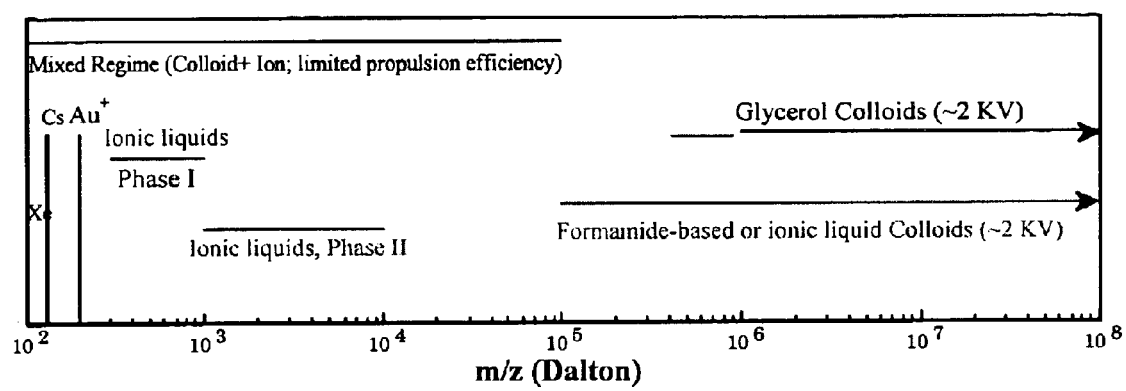
FIG. 1 represents the mass over charge ranges potentially offered by proposed or existing fuel materials, including glycerol, formamide and ionic liquids.

One goal of the present invention is to generate smaller and more highly charged colloids unmixed with ions, in order to extend the pure colloid regime below the current limit of $10^5$ Dalton. Another goal is to increase the range of masses and chemical composition of ions that can be generated from Taylor cones. These two goals can be attained to a considerable degree with water-based electrolytes, but only provided one succeeds first at forming Taylor cones of water in a vacuum or a low-pressure environment without the cones being disrupted by boiling, evaporative cooling and/or freezing of the liquid meniscus.

The low-pressure environment used in this invention generally includes pressures substantially lower than atmospheric, so that large electric fields can be sustained without creating electrical discharges through the background gas. In practical systems, with characteristics lengths of millimeters and voltage changes of hundreds or thousands of volts, the background pressure must typically be smaller than about 0.1 torr, and preferably smaller than about 0.06 torr. However, higher pressures can be tolerated in smaller systems.

What follows is a disclosure of the reasons why water is in principle singularly qualified to reach such goals, and the various strategies proposed to avoid evaporative freezing.

While formamide offers the lowest known volatility combined with a low viscosity and a high dielectric constant, its greatest advantage is its low volatility. However, water is a much better solvent than formamide from all but the volatility viewpoint:

1) Water is about three times less viscous than formamide, and its electrolytes are capable of reaching electrical conductivities more than 10 times larger than those of formamide. Furthermore, at the same electrical conductivity, cone-jets of water will break up into smaller drops as a result of weaker viscous effects in the jet breakup process. This leads to narrower drop size distributions and a higher propulsive efficiency;

2) Water has a considerably larger surface tension than formamide. Therefore, a water drop of the same diameter as a formamide drop will hold more charge and will therefore have a smaller m/z.

3) Water has a considerably larger activation energy for ion evaporation than formamide for a given ion. Therefore, ion evaporation sets in at larger critical electric fields in water, thereby allowing the formation of smaller drops in the pure drop regime.

4) Formamide is relatively incompatible with both acids and bases, while water is eminently compatible with both. The significance of this fact is double. On the one hand, the $H^+$ and $OH^-$ ions are by far the most mobile known, thereby allowing electrical conductivities in water considerably larger than one order of magnitude higher than those possible in formamide. On the other hand, the least volatile ion known is precisely $H^+$. In other words, the activation energy for ion evaporation is known to increase with decreasing ion size, and the proton is by far the smallest ion that can be formed in solution.

Therefore, the use of acidic electrolytes, which are precluded with formamide, leads to the highest possible delay in the ion evaporation regime, thereby allowing the smallest possible drops produced in the pure drop regime. The use of acids is in principle undesirable in satellite propulsion due to the damage plumes can cause on other parts of the satellite or on neighboring satellites. However, acids as volatile as water can be used for this application, and their corrosive effects would be minimized since they would never condense on any surface in space. The use of volatile liquids as colloidal propellants is actually of considerable advantage from the point of view of providing a benign environment for external satellite surfaces. From this perspective, the combination water-HCl is superior to the combination formamide-KI or an ionic liquid, since salt deposits are inherently corrosive of metal surfaces. This volatility advantage also exists in formamide-ammonium acetate mixtures.

The high surface tension of water, its unusually strong binding to most ions, and its high compatibility with acids makes it the solvent of choice from the point of view of delaying ion evaporation and opening the pure drop regime to the smallest and most highly charged drop sizes possible. This combination of singular properties would lead to the closure from the right of much of the gap shown in FIG. 1 below $10^5$ Dalton, if only one could form Taylor cones of water in a vacuum or a low-pressure environment. In addition, the very high electrical conductivity attainable in water electrolytes makes it also of singular interest to operate in the regime where ions are dominantly, or exclusively, produced.

Figure 2A:
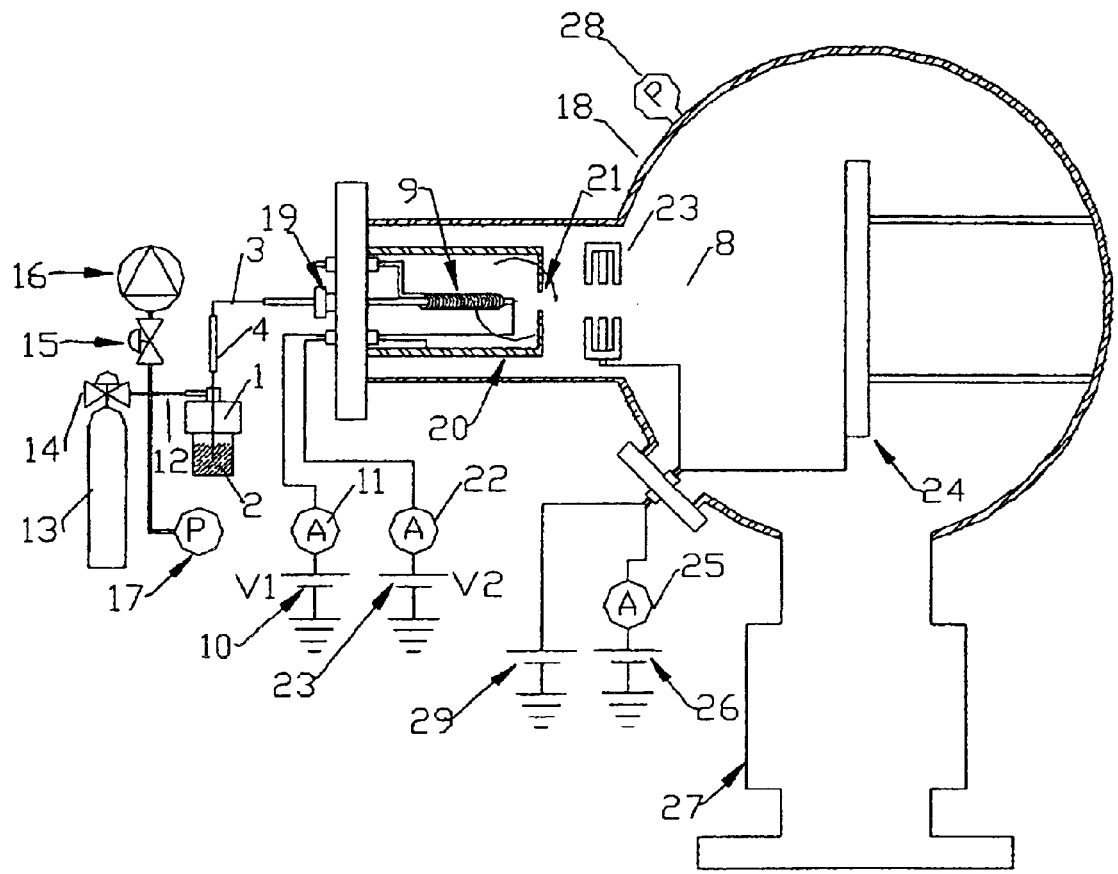
FIG. 2A is a schematic of an apparatus that represents one embodiment of the present invention.
Figure 2B:
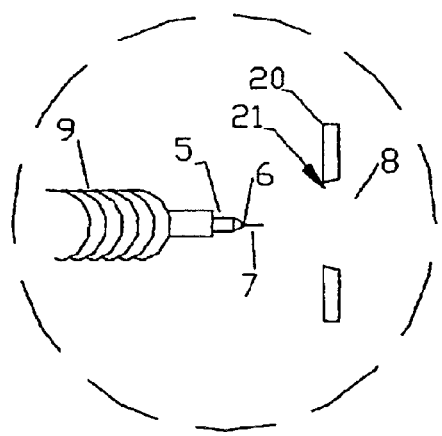

A better understanding of the invention may be obtained with reference to its embodiment shown in FIG. 2A. The apparatus comprises an air tight reservoir (1) chemically inert with respect to the working fluid (2) held within it. This liquid may be, for instance, water, an organic solvent, or another volatile liquid. A liquid transfer line (3) communicates the liquid (2) in reservoir (1) with the emitter electrode (5) supporting the liquid meniscus (6), as shown in the expanded view of FIG. 2B. The transfer line (3) is a capillary tube of fused silica with an inner diameter of 20 $\mu$m and an outer diameter of 360 $\mu$m. This line (3) may be divided into two portions to accommodate a bubble-type flow meter (4) in between, which serves the purpose of monitoring the flow rate (Q) of liquid fed to the tip of the transfer line. The end of transfer line (3) constitutes in the present case the emitter electrode (5). The emitter electrode (5) is sharpened into a cone that ends at a diameter of 20 $\mu$m coinciding approximately with the inner diameter of the capillary tube (3), and is represented in FIG. 2B as the wider and clear portion of the cone. The liquid meniscus (6) barely discernible at the scale of FIG. 2B, is represented as the dark cone continuing the clear cone (5). The basis of the liquid meniscus, in this instance, is therefore about 20 $\mu$m.

The apparatus includes means (9) for controlling the temperature of the meniscus (6). In other embodiments of the invention, it may be preferable to build parts (1), (3), (4), (5) and (9) within a miniaturized single block. A fine jet (7) emerges from the apex of the Taylor cone (6), which in turn leads to the spray (8) of ions and/or drops. The emitter electrode (5) is made conducting in this instance by deposition of a thin film of semiconducting oxide or metal on the silica capillary. It is maintained at electrical potential $V_1$ by electrical contact with power supply (10), through an electrometer (11), which monitors the electrospray current. In another embodiment of the invention, the power supply (10) may be put in electrical contact with the meniscus (6) through the solution by means of an electrode introduced into the liquid (2) in reservoir (1). In the particular configuration of FIG. 2A, the flow rate (Q) of liquid into the meniscus (6) is controlled by introducing gas in the reservoir through line (12) from the compressed gas source (13) through valve (14), or by withdrawing it into a vacuum source (16) through valve (15). The pressure of gas in reservoir (1) is monitored through differential gauge (17). The liquid meniscus (6) emerges into the interior of vacuum chamber (18). The capillary tube (3) enters into the vacuum chamber (18) through connector (19), which ensures a leak-free coupling. The emitter electrode (5) holding the liquid meniscus (6) is surrounded by the extractor electrode or grid (20), in turn connected to a second power supply (23) which keeps it at a fixed voltage $V_2$. The apparatus may also comprise a second electrometer (22). The voltage difference $V_1$-$V_2$ is controlled such that a Taylor cone jet forms on the meniscus (6). The jet (7) or the spray (8) issuing from the Taylor cone leaves the region between emitter and extractor through opening (21). This beam then goes through the beam manipulation system (23), where its various components may be separated, focused, partly neutralized, steered, collimated, etc.

In another embodiment of the invention, the extractor electrode (20) may be microfabricated together with the emitter electrode (5) and reservoir system (1), and the liquid flow rate may be controlled at fixed reservoir backpressure by means of the voltage difference $V_2$-$V_1$ between extractor and emitter. The flow control system may include a feedback loop aimed at setting the spray current at a fixed value. For applications such as ion propulsion not requiring a sharply focused beam, the ion source may consist of many rather than just one emitter, each with its own current control system. The apparatus may include a target (24) where the beam is collected. It is kept at potential $V_3$ by power supply (26). The target (24) may be simply a phosphor screen or a target surface across which the beam is steered for writing or etching purposes. In applications such as electrical propulsion, the target (24) may simply be an opening letting the beam escape into the vacuum environment. Under terrestrial conditions, chamber (18) may need to be evacuated via pump (27), and its pressure monitored through gauge (28). Pump (27) may be unnecessary in sealed systems where the working liquid (2) has a partial pressure smaller than the desired operating pressure in the chamber. Such would be the case when, for instance, one or many ion sources are used to create an image on a monitor, or as an amplifier where small voltage variations result in large current variations, or in similar other devices.

It should be understood that the foregoing description is only illustrative of the invention. Although FIGS. 2A and 2B represent a liquid meniscus (6) with only one Taylor cone, multiple Taylor cones supported on a single emitter electrode are also included in the invention. Although FIG. 2A shows only a single source of charged particles, many such sources can be combined to produce more intense beams. The term liquid reservoir (1) should be understood in the broad sense, since the full liquid sample could be placed initially on the emitter electrode without the need for either the external container (1) or the liquid transfer line (3).

In accordance with the present invention, two suitable approaches for minimizing evaporation of volatile liquids in a low-pressure environment, while allowing for the formation of a stable electrospray are provided below.

In the first approach, two or more liquids are supplied into an emitter electrode located in a low-pressure environment, wherein at least one of the liquids is volatile and at least another one is involatile and immiscible with at least another of the other liquids. The evaporation-reduction means comprises covering the free surface of the volatile liquid with a layer of at least one of the other liquids, so as to minimize direct exposure of the volatile liquid to the low-pressure region and reduce the tendency of the volatile liquid to freeze, boil, or evaporate in the low-pressure environment.

In the first approach, a Taylor cone is formed, composed of a core liquid surrounded by one or several layers of other liquids. Loscertales et al., A Novel Technique to Produce Multicomponent Micro/Nano Capillary Jets and Micro/Nano Capsules by Electrohydrodynamic Forces, Journal of Aerosol Science, Vol. 32, pp. S611–S612 (2001), the subject matter of which is herein incorporated by reference in its entirety, have demonstrated that it is possible to form Taylor cones using water as the core liquid and olive oil as the peripheral liquid. However, their work was restricted to atmospheric conditions. Their study also showed the feasibility of other comparable combinations of volatile core liquids' with an external liquid of low volatility. Loscertales et al., Micro/Nano Encapsulation via Electrified Coaxial Jets, Science, Vol. 295, pp. 1695–1698 (2002), the subject matter of which is herein incorporated by reference in its entirety, provides additional details of the Loscertales et al. (2001) study. The fact that oil has a very small electrical conductivity indicates that it is possible to uncouple completely the need for high conductivity with the need for low volatility. Each of the two liquids in the combination takes care independently of one of these two necessary properties. We note that the work of Loscertales et al. (2001, 2002) is directed at the task of creating encapsulated spheres, and is not concerned with the volatility of the outer component, nor with the important task of decoupling the surface characteristics of the outer liquid from the bulk properties of the core liquid. This decoupling, however, is the basis of this first approach to the present invention.

As described below, the behavior of Taylor cones is not affected by whether or not the meniscus of the sprayed liquid is surrounded by a gas or a vacuum, provided that the liquid in direct contact with the low-pressure environment has a small volatility and the gas is in a pressure range high enough or low enough to preclude electrical discharges. Consequently, we have improved the method of Loscertales et al. (2001, 2002) to demonstrate the feasibility of spraying oil-sheathed water jets in a vacuum. We have further improved their coaxial liquid injector to enable much smaller liquid flow rates in the range required for electrical propulsion at high specific impulse.

Figure 3A:
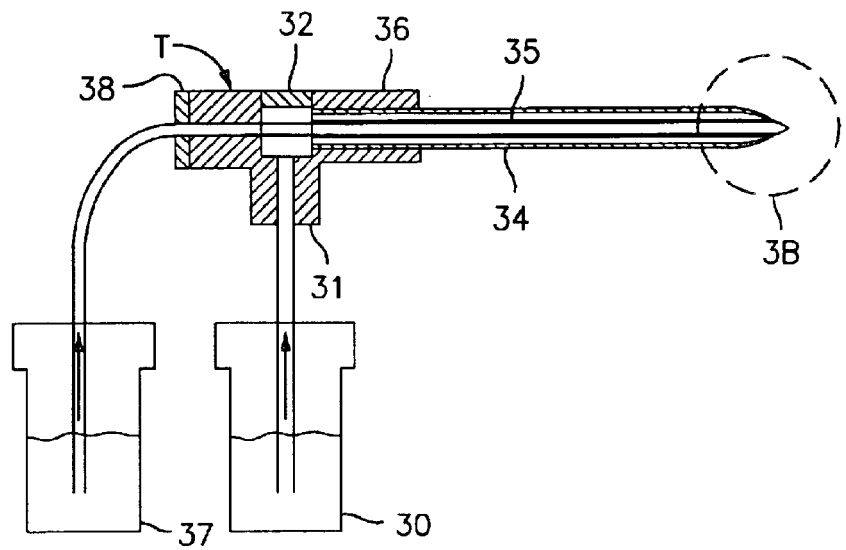
FIGS. 3A, 3B, and 3C is a schematic of the supply system used to produce coaxial Taylor cones of oil-sheathed water.
Figure 3B:
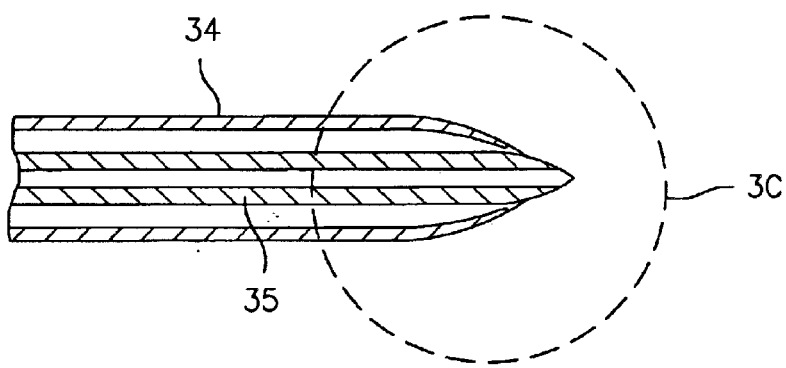
Figure 3C:
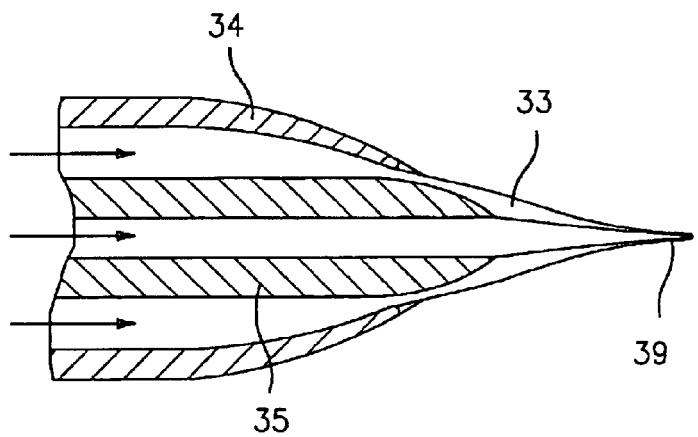

The apparatus used in this approach is similar to that described in FIGS. 2a and 2b, except that it includes means to greatly reduce the evaporation rate of the conducting liquid driving the formation of the Taylor cone. Instead of a single reservoir connected to a single capillary, as shown in FIGS. 2a and 2b, the embodiment exemplified in FIGS. 3A, 3B, and 3C contains multiple reservoirs (30 and 37) connected to a plurality of capillary tubes. The preferred volatile liquid is water, although it could be another of the many solvents of common use, whose boiling points are generally smaller than 240° C. In the Figures, two capillary tubes are assembled one inside the other. The outer capillary (34) has a preferred outer diameter of 0.35 mm and a preferred inner diameter of 0.18 mm, while the inner capillary (35) has a preferred outer diameter of about 0.160 mm and a preferred inner diameter of 0.025 mm. Oil is fed from a reservoir (30) into the lower branch (31) of a T (32) of the low dead volume type commonly used in liquid chromatography. From there, it goes into the annular space (33) (shown in FIG. 3C) between the inner (35) and the outer (34) capillary, both of which leave the T (32) concentrically through its right branch (36). Water or another relatively volatile liquid is fed from a second reservoir (37) into the inner capillary (35), which enters into the left branch (38) of the T (32), and leaves through its right branch (36) inside the inner capillary (35). This arrangement is comparable in concept to that used by Loscertales et al. (2001) to produce composite Taylor cones of two coaxial liquids. But it reduces dramatically the fill time of the various volumes involved by minimizing them, and enables control of much smaller liquid flow rates. The two capillaries (34 and 35) leaving approximately concentrically the right arm (36) of the T (32) then go into the evacuated region, and support at their end a composite Taylor cone (39) of water surrounded by a thin layer of involatile liquid. In a preferred embodiment, this outer or sheath liquid may be diffusion pump oil of small viscosity. Neovac SY diffusion pump fluid (available from Varian, Lexington, Mass.), with a room temperature viscosity coefficient of 45 cp serves adequately for this purpose. However, many other liquids immiscible with the inner liquid would serve similarly as the outer liquid. One should note in particular that the outer liquid does not need to have such a small vapor pressure as a diffusion pump oil, and in many applications it would even be desirable that it has a vapor pressure only one or a few orders of magnitude smaller than the inner liquid.

An apparatus forming a coaxial Taylor cone of water and diffusion pump oil according to the design disclosed has been able to maintain stable Taylor cones of oil-protected water in a vacuum environment for periods in excess of one hour. A further improvement of that design enabling better control of the flow rate of the outer fluid is based on augmenting its flow resistance near its end. This is achieved by pulling or elongating the emitting end of the outer capillary tube under a flame, and then cutting it at a position such that its exit inner diameter is smaller than the outer diameter of the inner capillary. When the emitting end of the inner capillary has been polished into a conical shape, the inner capillary can emerge past the end of the outer capillary, leaving a very small gap of controllable dimensions. This procedure not only increases the flow resistance without affecting the fill time, but also centers the inner capillary inside the outer capillary, avoiding the preferential filling of only part of the annular gap between the two capillaries, and avoiding anomalous wetting of the emitting tip by the liquid.

In the second approach, a volatile liquid is supplied to the emitter electrode, and the evaporation-reduction means comprises reducing the free surface area of the volatile liquid exposed to the low-pressure region to below a critical value, such that evaporative cooling does not cause the Taylor cone to freeze.

The cooling rate for the meniscus surface is proportional to the latent heat of vaporization L times the rate of liquid evaporation, which in a vacuum is proportional to the meniscus area. This heat may be replaced only by conduction and convection through the fluid. Convection is negligible near the base of a Taylor cone, which accounts for most of its area. The rate of heating by conduction is hence dominant, as well as proportional to the characteristic length of the cone. Consequently, the temperature distribution is determined by a balance between evaporative cooling, proportional to the square of the cone length, and conductive heating, proportional to cone length. Accordingly, the smaller the cone the less the cooling effect. As a result, there must be a critical cone dimension $r_o$, below which evaporative cooling is no longer able to bring the cone below the freezing point. Its value can be estimated readily.

The speed of liquid evaporation is a constant which, for the case of water at a few degrees C., can be estimated to be c=0.068 cm/s. If the radius of the cone base is R then $$\text{Evaporative heat loss} \sim R^2 \rho L c \qquad (1)$$

Similarly, $$\text{Conductive heat gain} \sim \lambda R \, \Delta T, \qquad (2)$$

where L is the latent heat of vaporization per unit mass of the liquid, and $\Delta T$ the reduction of temperature from the meniscus tip (the coldest point) to its basis, kept near room temperature. $\rho$ is the liquid density and $\lambda$ the heat conductivity. The critical length $r_o$ is obtained by equating both heats and putting $\Delta T$ equal to the difference between ambient temperature and the freezing point. This leads to $$r_o \sim \frac{\lambda \Delta T}{c \rho L}. \qquad (3)$$

For the case of water, using $\Delta T$=20 K, we obtain $r_o \sim 7 \, \mu m$. For non-axisymmetrical geometries, this corresponds to an exposed free surface area of less than about 100 $\mu m^2$, preferably less than about 40 $\mu m^2$. In reality, it is almost sure that water will supercool substantially before freezing, since the cold region of the meniscus is not in contact with any surface. $\Delta T$ may therefore be 30 or 40 K rather than 20 K, and the value of $r_o$ will likely exceed 10 $\mu m$. This emitter tip dimension is not difficult to attain. In this respect, one should note that future colloidal or ionic thrusters will almost surely be based on large arrays of microfabricated emitters, with Taylor cone base diameters typically of 1 $\mu m$. This miniaturization effort is therefore ideally fitted for the application of the present invention.

What is claimed is:

1. A method of forming a stable electrospray of a volatile liquid in a low pressure environment comprising the steps of:
   a. supplying two or more liquids into an emitter electrode located in a low pressure environment, wherein at least one of said liquids is a volatile liquid and at least one of said liquid is an involatile liquid, wherein a tendency of said at least one volatile liquid to freeze, boil, or evaporate is diminished by covering substantially all free surfaces of said at least one volatile liquid with one or more layer of said at least one involatile liquid, so as to minimize direct exposure of said at least one involatile liquid to said low pressure environment, and
   b. establishing a voltage difference between said emitter electrode and one or more surrounding electrodes or grids, wherein a meniscus formed by said two or more liquids supplied to said emitter electrode forms one or more Taylor cones, from whose tip region at least one of drops and ions of said two or more liquids are ejected.

2. A method according to claim 1, wherein said at least one involatile liquid is supplied to said emitting electrode by being fed through one or more outer capillary tubes, and said one or more outer capillary tubes surround one or more inner capillary tubes, and said at least one volatile liquid is supplied to said emitting electrode by being fed though said one or more inner capillary tubes.

3. A method according to claim 2, wherein said one or more inner capillary tube; are centered in said one or more outer capillary tubes.

4. A method according to claim 3, wherein the exit region of the outermost capillary tube and the exit region of at least one of said inner capillary tubes are non-cylindrical, such that a gap between said outermost capillary tube and said inner capillary tube can be almost closed by axially moving one tube with respect to the other to center said inner capillary tube in said outer capillary tube.

5. A method according to claim 1, wherein said voltage difference between said emitter electrode and said surrounding electrodes or grids is controlled such that part or all of said at least one of drops or ions issuing from said Taylor cone pass through one or several openings in said surrounding electrodes or grids, or directly through the pores of said grid, to form a beam of said at least one of drops or ions.

6. A method according to claim 1, wherein said at least one volatile liquid is selected from the group consisting of water and solvents having a boiling point of less than about 240° C.

7. A method according to claim 1, wherein said at least one involatile liquid is an ionic liquid.

8. A method according to claim 1, wherein said at least one involatile liquid is oil.

9. A method according to claim 1, wherein said emissions of said at least one of drops and ions are used for electrical propulsion.

10. A method according to claim 9, wherein several stable electrosprays of said at least one volatile liquid are used in parallel to increase output of said electrical propulsion.

11. A method according to claim 1, wherein said low-pressure environment is maintained by means of a vacuum pump.

12. A method according to claim 1, wherein said low-pressure environment is maintained at a pressure of less than about 0.1 torr.

13. A method according to claim 1, wherein said ions are used for mass spectrometry.

14. A method according to claim 1, wherein emissions of said at least one of drops and ions are directed to a surface in order to erode said surface or to form features on said surface or to eject secondary ions from said surface.

15. An apparatus for forming a stable electrospray of a volatile liquid in a low pressure environment comprising:
   a) two or more electrodes or grids, including at least one emitter electrode and at least one extractor electrode or grid;
   b) means to establish a difference of electrical potential between at least two of said electrodes or grid; and
   c) means for supplying a flow of two or more liquids from at least two reservoirs to said emitter electrode;
   wherein said difference of electrical potential is controlled to form a Taylor cone jet in said emitter electrode from whose tip region at least one of drops and ions of said two or more liquid are ejected into said low-pressure environment.

16. An apparatus according to claim 15, wherein said liquid supply means delivers at least one volatile liquid and at least one involatile liquid.

17. An apparatus according to claim 16, wherein said liquid supply means includes a capillary assembly comprising one or more outer capillary tubes and one or more inner capillary tubes, wherein the one or more outer capillary tubes surround the one or more inner capillary tubes, said outer capillary tubes for transporting said at least one involatile liquid and said inner capillary tubes for transporting said at least one volatile liquid.

18. An apparatus according to claim 17, wherein said one or more inner capillary tubes carrying said at least one volatile liquid enter a first branch of a T and exit a second branch of a said T, and said at least one involatile liquid enters a third branch of said T, and said one or more outer capillary tubes carrying said at least one involatile liquid exit said second branch of said T, wherein said at least one or more inner capillary tubes are assembled inside of said one or more outer capillary tubes in said T as said inner capillary tubes and said outer capillary tubes exit said second branch of said T.

19. An apparatus according to claim 17, wherein said one or more inner capillary tubes are centered in said one or more outer capillary tubes exiting said second branch of said T.

20. An apparatus according to claim 19, wherein the exit region of the outermost capillary tube and the exit region of at least one of said inner capillary tubes are non-cylindrical, such that a gap between said outermost capillary tube and said inner capillary tube can be almost closed by axially moving one tube with respect to the other to center said inner capillary tube in said outer capillary tube.

21. An apparatus according to claim 15, wherein said low-pressure environment is maintained by means of a vacuum pump.

22. An apparatus according to claim 15, wherein said low-pressure environment is maintained at a pressure of less than about 0.1 torr.

23. An apparatus according to claim 15, further comprising a beam manipulation system positioned in said low-pressure environment downstream of the tip of said emitter electrode.

24. An apparatus according to claim 15, further comprising a target positioned in the low-pressure environment downstream of the tip of said emitter electrode, wherein a beam of said at least one of drops and ions is directed to said target in order to erode said target or to form features on said target or to eject secondary ions from said target.

* * * * *

UNITED STATES PATENT AND TRADEMARK OFFICE
CERTIFICATE OF CORRECTION

PATENT NO.    : 6,825,464 B2
DATED         : November 30, 2004
INVENTOR(S)   : Juan Fernandez De La Mora It is certified that error appears in the above-identified patent and that said Letters Patent is hereby corrected as shown below:

Column 9,
Line 44, between "said" and "is an," delete "liquid" and replace it with -- liquids --
Line 48, between "more" and "of said," delete "layer" and replace it with -- layers --
Line 63, between "fed" and "said," delete "though" and replace it with -- through --
Line 66, between "capillary" and "are centered," delete "tube" and replace it with
-- tubes; --

Column 10,
Line 47, between "electrodes or" and "and," delete "grid;" and replace it with -- grids; --
Line 53, between "or more" and "are ejected," delete "liquid" and replace it with
-- liquids --

Column 11,
Line 2, between "branch of" and "said T," delete "a"

Signed and Sealed this

First Day of March, 2005

JON W. DUDAS
*Director of the United States Patent and Trademark Office*